United States Patent [19]

Iida et al.

[11] Patent Number: 5,073,451

[45] Date of Patent: Dec. 17, 1991

[54] HEAT INSULATING GLASS WITH DIELECTRIC MULTILAYER COATING

[75] Inventors: Yasunobu Iida, Matsusaka; Nobuyuki Takeuchi, Ise; Masato Nakamura, Mie; Koichi Furuya; Hiroshi Nakashima, both of Matsusaka; Toshiaki Itoh, Tsu, all of Japan

[73] Assignee: Central Glass Company, Limited, Ube, Japan

[21] Appl. No.: 560,816

[22] Filed: Jul. 31, 1990

[30] Foreign Application Priority Data

Jul. 31, 1989 [JP] Japan .................................. 1-198304
Feb. 16, 1990 [JP] Japan .................................. 2-35298

[51] Int. Cl.$^5$ .......................... G02B 5/22; B32B 17/06
[52] U.S. Cl. .................................. 428/336; 428/212; 428/432; 428/697; 428/698; 428/699; 428/701; 428/702; 428/704; 359/359; 359/589
[58] Field of Search ............... 428/426, 432, 698, 697, 428/212, 699, 701, 702, 704, 913, 336; 350/164, 166, 1.6

[56] References Cited

U.S. PATENT DOCUMENTS

| | | | |
|---|---|---|---|
| 3,853,386 | 12/1974 | Ritter et al. | 350/164 |
| 3,922,068 | 11/1975 | Uetsuki | 350/166 |
| 4,099,840 | 7/1978 | van der Wal et al. | 350/166 |
| 4,504,109 | 3/1985 | Taga et al. | 350/1.6 |
| 4,647,812 | 3/1987 | Vriens et al. | 350/1.6 |
| 4,834,857 | 5/1989 | Sillery | 428/432 |
| 4,940,636 | 7/1990 | Brock et al. | 428/426 |
| 4,965,121 | 10/1990 | Young et al. | 428/432 |

FOREIGN PATENT DOCUMENTS

3902456A1 1/1989 Fed. Rep. of Germany .
60-81047 5/1985 Japan .
63-131101 6/1988 Japan .
63-206333 8/1988 Japan .
63-242948 10/1988 Japan .
64-5930 1/1989 Japan .

*Primary Examiner*—Ellis P. Robinson
*Assistant Examiner*—Archene A. Turner
*Attorney, Agent, or Firm*—Fleit, Jacobson, Cohn, Price, Holman & Stern

[57] ABSTRACT

The invention provides a heat insulating glass plate with a multilayer coating which is fairly low in transmittance for solar radiation and fairly high in transmittance for the visible light and also for radio waves. The multilayer coating is a lamination of transparent and dielectric layers and has three essential layers in which the middle layer is higher or lower in refractivity than the inner and outer layers. The coating may have five layers in which the second and fourth layers are higher or lower in refractivity than the remaining three layers. Each layer of the multilayer coating is a metal compound film deposited by sputtering or CVD. In a first embodiment of the three-layer coating each of the inner and outer layers is formed of $SnO_x$, $ZrO_x$, $TaO_x$ or $AlN_x$ having a refractive index of 1.8–2.1 and the middle layer is formed of $TiO_x$ having a refractive index of 2.2–2.5. In a second embodiment, each of the inner and outer layers is formed of $SnO_x$, $TiO_x$, $ZrO_x$, $TaO_x$, $ZnO_x$, $AlN_x$ or $SiN_x$ having a refractive index of 1.8–2.5 and the middle layer is formed of $SiO_x$, $AlO_x$ or $Si.AlO_x$ having a refractive index of 1.4–1.7. The heat insulating glass plates are useful as vehicle window glasses, and the second embodiment of the multilayer coating is very suitable for use in laminated glass.

12 Claims, 2 Drawing Sheets

FIG. 4

HEAT INSULATING GLASS WITH DIELECTRIC MULTILAYER COATING

BACKGROUND OF THE INVENTION

This invention relates to a heat insulating glass plate particularly suitable for use as a vehicle window glass, and more particularly to a transparent glass plate having a heat insulating multilayer coating which is made up of a least three transparent and dielectric layers.

To produce a heat insulating glass low in transmittance for solar radiation it is well known to use a coating film of silver which is high in infrared reflectance. However, silver film is low in durability and wear resistance and also in transmittance for the visible light. Therefore, when a heat reflecting or insulating glass using a silver film is required of relatively high transmittance for the visible light as in the case of a vehicle window glass it is usual to form a multilayer coating by providing a transparent metal oxide film on each side of a silver film. However, even though such a measure is taken a heat reflective coating using silver is poor in moisture resistance and weather resistance.

To provide a heat reflecting or insulating glass which is high in durability, there are various proposals of multilayer coatings using a heat reflective metal other than silver or a metal nitride. JP-A 61-55603 shows a two-layer coating consisting of a Ti, Cr, Co or Ni film coated on a glass surface and a TiN film covering the metal film. JP-A 63-242948 shows a three-layer coating made up of a film of a metal such as Ti, Zr, Cr, Ni or Ta coated on a glass surface, a TiN or TaN film on the metal film and a metal oxide film as the outermost layer. However, heat reflecting glasses according to these publications are relatively high in reflectance for the visible light incident on the uncoated side and are not fully satisfactory in the durability of the coating, and hence it is difficult to employ either of these proposals in an automobile window glass using a single (not laminated) glass plate.

JP-A 63-206333 shows a heat reflecting glass with a multilayer coating which is, for example, made up of a $TiO_2$ film deposited on the glass surface, a TiN film on the oxide film, A $TiO_2$ film on the nitride film and a $SiO_2$ film as the outermost layer. JP-A 64-5930 shows a heat insulating glass relatively high in transmittance for the visible light, which has a multilayer coating made up of, for example, a $SnO_2$ film on the glass surface, a $TiO_2$ film as the second layer, a TiN film as the third layer, a $TiO_2$ film as the fourth layer, and a $SnO_2$ film as the fifth layer. The coatings according to these proposals include no metal film. Therefore, to make these multilayer coatings comparable to a heat reflective coating using a metal film it is necessary to form relatively thick films of TiN and $TiO_2$ and this is unfavorable for productivity. Further, the adhesion of the nitride film to the oxide films is not always sufficiently strong.

When a heat reflecting or insulating glass, which may be a laminated glass, with a coating including an electrically conductive layer such as a metal layer or a TiN layer is used as a windshield or window glass of a recent automobile, there arises another problem that the coating exhibits an electromagnetic shielding effect and hence obstructs the transmission or reception of radio waves, for example, to use a mobile phone, to operate a remote controller for opening or closing a powered shutter of a garage or to receive radio or television broadcasting by using a so-called glass antenna attached to the inboard side of the windshield or window glass.

In this connection, JP-A 60-81047 shows a vehicle window glass having an electromagnetic shielding multilayer coating on each side of the glass plate. On the outboard side, the coating includes a transparent and conductive film such as an ITO (indium-tin oxide) film which is below $10^2 \Omega/\square$ in sheet resistivity for electromagnetic shielding and a heat reflecting dielectric layer formed by alternate lamination of $TiO_2$ film which is relatively high in refractivity and $SiO_2$ film which is relatively low in refractivity. On the inboard side the coating includes an ITO film and a dielectril layer (a combination of $TiO_2$ film and $SiO_2$ film) for reducing reflection of the visible light. The electromagnetic shielding effect of this window glass is for preventing noises of the onboard electronics by the influence of extraneous electromagnetic waves, but this effect is obstructive to the transmission or reception of radio waves for the aforementioned purposes.

Meanwhile, JP-A 63-131101 shows a glass plate having a dielectric multilayer coating which is for reducing reflection of the visible light and consists of several layers different in refractivity. The coating has a first layer, as the innermost layer, relatively high in refractivity, a second layer of $SiO_2$ or $Al_2O_3$ relatively low in refractive index (about 1.5), a third layer relatively high in refractivity and a fourth layer of $SiO_2$ or $Al_2O_3$ relatively low in refractive index, and at least one of the first and third layers is a lamination of a film of, e.g., $Ta_2O_5$, $ZrO_2$ or $SnO_2$ having a refractive index of 1.9–2.2 and a film of, e.g., $TiO_2$ having a refractive index of 2.2–2.5. In this publication neither insulation of heat by the coating nor transmittance of radio waves through the coating is a matter of concern.

SUMMARY OF THE INVENTION

It is an object of the present invention to provide a heat insulating glass plate with a multilayer coating, which is sufficiently low in transmittance for solar radiation, sufficiently high in transmittance for the visible light and also for radio waves, good in durability and suitable for use as a vehicle window glass.

The present invention provides a heat insulating glass plate having a multilayer coating on one side of a transparent glass plate, the multilayer coating comprising a first layer which is a transparent and dielectric film of a metal compound having a refractive index in the range from 1.8 to 2.1 deposited on the glass plate surface, a second layer which is a transparent and dielectric film of a metal compound having a refractive index in the range from 2.2 to 2.5 deposited on the first layer, and a third layer which is a transparent and dielectric film of a metal compound having a refractive index in the range from 1.8 to 2.1 deposited on the second layer. Each of the above defined three layers is formed by a sputtering process or a chemical vapor deposition (CVD) process and has a thickness in the range from 100 to 2000 Å and a surface resistivity not lower than 10 $k\Omega/\square$, and the multilayer coating is formed such that the heat insulating glass plate is not lower than 65% in transmittance for the visible light, not higher than 15% in reflectance for the visible light and not higher than 65% in transmittance for solar radiation and such that the heat insulating glass plate is lower than the glass plate itself in transmittance for solar radiation by at least 5%.

Optionally, the multilayer coating may further comprise a fourth layer which is a transparent and dielectric film of a metal compound having a refractive index in the range from 2.2 to 2.5 deposited on the third layer and a fifth layer which is a transparent and dielectric film of a metal compound having a refractive index in the range from 1.8 to 2.1 deposited on the fourth layer. Each of the fourth and fifth layers is formed by a sputtering process or a CVD process and has a thickness in the range from 100 to 2000 Å.

In the above defined three-layer or five-layer coating, $SnO_x$ ($0 < x \leq 2$), $TaO_x$ ($0 < x \leq 2.5$), $ZrO_x$ ($0 < x \leq 2$) or $AlN_x$ ($0 < x \leq 1$) is useful as a dielectric metal compound having a refractive index in the range from 1.8 to 2.1, and $TiO_x$ ($0 < x \leq 2$) is suitable as a dielectric metal compound having a refractive index in the range from 2.2 to 2.5.

The multilayer coating is excellent in the tightness of adhesion to the glass surface and also adhesion of each layer to the adjacent layer(s). This multilayer coating is constructed by alternately laminating two kinds of dielectric films which are relatively low in refractivity and relatively high in refractivity, respectively, and the refractive index of each dielectric film is limied within a specific and strict range. Therefore, there is a considerable difference in refractivity between the glass plate and the first layer of the multilayer coating, between two adjacent layers of the multilayer coating and between the outermost layer of the coating and the air, and accordingly an interference effect arises at each interface. By collectively utilizing the interference effects at the respective interfaces the multilayer coating is made very high in transmittance for the visible light and low in reflectance for the visible light.

The dielectric multilayer coating is sufficiently high in heat insulating capability and also in transmittance for radio waves including radio and television broadcast waves. Furthermore, the multilayer coating is excellent in weather resistance, moisture resistance and chemical resistance. The wear resistance of the coating is good and reaches such a degree that by the Taber test using abrading wheels of CS-10F type neither the amount of a change in the transmittance for the visible light nor the amount of a change in haze value exceeds 10% after 1000 turns of the abrading wheels.

Optionally, the third dielectric layer of the three-layer coating or the fifth dielectric layer of the five-layer coating may be overlaid with a film of an oxide of Si and/or Al having a thickness in the range from 100 to 2000 Å. This oxide film serves as a protective layer.

A heat insulating glass plate having the above described multilayer coating can be used as a single glass plate (not laminated) and is very suitable as a vehicle window glass or a building window glass. Also it is possible to use this heat insulating glass plate in a laminated glass or an insulated glass.

Furthermore, the present invention provides a heat insulating glass plate which is particularly suitable as a component of a laminated glass panel for use as a vehicle windshield or window glass. The heat insulating glass plate comprises a multilayer coating formed on one side of a transparent glass plate. In this case the multilayer coating comprises a first layer which is a transparent and dielectric film of a metal compound having a refractive index in the range from 1.8 to 2.5 deposited on the glass plate surface, a second layer which is a transparent and dielectric film of a metal compound having a refractive index in the range from 1.4 to 1.7 deposited on the first layer, and a third layer which is a transparent and dielectric film of a metal compound having a refractive index in the range from 1.8 to 2.5. Each of the three dielectric films is formed by a sputtering process or a CVD process and has a thickness in the range from 500 to 2000 Å, and the multilayer coating is formed such that the heat insulating glass plate is not lower than 70% in transmittance for the visible light, not higher than 15% in reflectance for the visible light, not higher than 60% in transmittance for solar radiation and not lower than 20% in reflectance for solar radiation and has a surface resistivity not lower than 10 k$\Omega$/□.

Optionally, this multilayer coating may further comprise a fourth layer which is a transparent and dielectric film of a metal compound having a refractive index in the range from 1.4 to 1.7 deposited on the third layer and a fifth layer which is a transparent and dielectric film of a metal compound having a refractive index in the range from 1.8 to 2.5 deposited on the fourth layer. Each of the fourth and fifth layers is formed by a sputtering process or a CVD process and has a thickness in the range from 500 to 2000 Å.

In this three-layer or five-layer coating, $SnO_x$ ($0 < x \leq 2$), $TiO_x$ ($0 < x \leq 2$), $TaO_x$ ($0 < x \leq 2.5$), $ZrO_x$ ($0 < x \leq 2$), $AlN_x$ ($0 < x \leq 1$) or $SiN_x$ ($0 < x \leq 4/3$) is useful as a dielectric metal compound having a refractive index in the range from 1.8 to 2.5, and $SiO_x$ ($0 < x \leq 2$), $AlO_x$ ($0 < x \leq 1.5$) or $Al.SiO_x$ ($0 < x \leq 7/2$) is suitable as a dielectric metal compound having a refractive index in the range from 1.4 to 1.7.

This multilayer coating too is constructed by alternately laminating two kinds of dielectric films which are relatively low in refractivity and relatively high in refractivity, respectively, and the refractive index of each dielectric film is limied within a specific and strict range. The purpose of employing such a construction is as explained hereinbefore.

This multilayer coating is sufficiently high in reflectance for solar radiation and transmittance for the visible light and also in transmittance for radio waves including radio and television broadcast waves. Furthermore, the multilayer coating is excellent in weatherability, durability and chemical stability.

A heat insulating glass plate having this multilayer coating is very suitable for producing a heat insulating laminated glass panel for use as a vehicle windshield or rear window glass by lamination with an uncoated transparent glass plate using a plastic interlayer such as a polyvinyl butyral film. Also it is possible to use this heat insulating glass plate singly.

When heat insulating glass plates according to the invention are used in an automobile as the windshield and/or window glasses, the heat insulating glasses serve the purpose of enhancing the air conditioning effects and afford good habitability. The windshield and/or window glasses are sufficiently transparent to the visible light and fairly low in reflection of the visible light on both the inboard and outboard sides and hence hardly exhibit mirror effects obstructive to the field of view. Furthermore, the heat insulating glass plates of the windshield and/or windows well transmit radio waves and hence do not obstruct the use of an onboard mobile phone or a remote controller of a powered shutter of a garage or the reception or radio or television broadcasting with a glass antenna.

DESCRIPTION OF THE PREFERRED EMBODIMENTS

Figure 1:
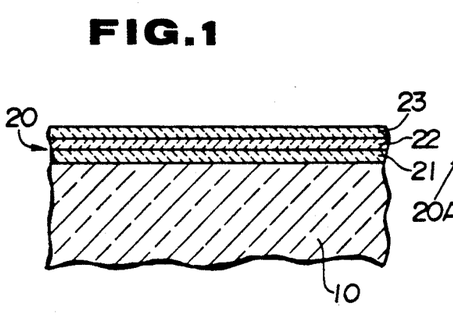
FIG. 1 is a fragmentary and explanatorily enlarged sectional view of a glass plate having a heat insulating three-layer coating according to the invention.
Figure 2:
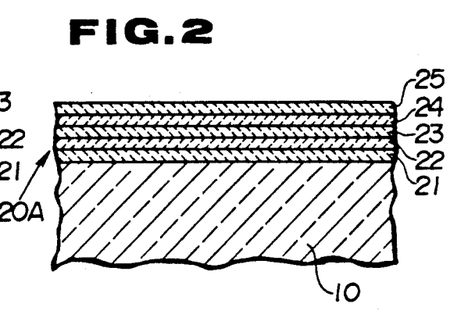
FIG. 2 is a similar sectional view of a glass plate having a heat insulating five-layer coating according to the invention.

FIG. 1 shows the fundamental construction of a heat insulating multilayer coating 20 according to the invention. The multilayer coating 20 is made up of a transparent and dielectric first layer 21 formed directly on one surface of a transparent glass plate 10, a transparent and dielectric second layer 22 which is laid on the first layer 21 and different in refractivity from the first layer 21, and a transparent and dielectric third layer 23 which is laid on the second layer 22 and similar in refractivity to the first layer 21. Referring to FIG. 2, the three-layer coating 20 of FIG. 1 may be modified to a five-layer coating 20A by forming a transparent and dielectric fourth layer 24 on the third layer 23 and a transparent and dielectric fifth layer 25 on the fourth layer 24. In respect of refractivity the fourth layer 24 is similar to the second layer 22, and the fifth layer 25 is similar to the first and third layers 21 and 23. Each of these five layers 21-25 is a metal oxide film deposited by a sputtering process or a CVD process. For forming any of these films 21-25 it is unsuitable to employ a wet process such as a sol-gel method using an organic metal compound solution because the obtained film is insufficient in strength and durability.

The transparent glass plate 10 may be either a colorless glass plate or a color glass plate. When the invention is applied to an automobile window glass it is rather preferable to use a grayish or bronze color glass plate because by using such a color glass plate it is easy to obtain a heat insulating glass plate which assumes a neutral color. The glass plate 10 may be a curved glass plate, and in that case the multilayer coating 20 or 20A can be formed after bending a flat glass plate into a curved glass plate or before the glass plate bending operation since the dielectric films 21-25 of the coating are hardly affected by the heat applied for bending the glass plate.

In the case where the second layer 22 of the multilayer coating 20 is higher in refractivity than the first and third layers 21 and 23 (this case will be referred to as Type I multilayer coating), it is suitable to use $SnO_x$ ($0<x\leq 2$), $TaO_x$ ($0<x\leq 2.5$), $ZrO_x$ ($0<x\leq 2$) or $AlN_x$ ($0<x\leq 1$) as the material of the first and third layers 21 and 23, and also the fifth layer 25 of the five-layer coating 20A, and $TiO_x$ ($0<x\leq 2$) as the material of the second layer 22 and also the fourth layer 24 of the five-layer coating 20A. Usually it is better to use $SnO_2$, $TaO_x$ or $ZrO_x$ than to use $AlN_x$. Using these dielectric materials every layer of the multilayer coating 20 or 20A is made so as to have a surface resistivity not lower than 10 kΩ/□, and preferably not lower than 100 kΩ/□. That is, a multilayer coating according to the invention is high in electrical resistance and does not include an electrically conductive layer, and hence the multilayer coating transmits radio waves without great attenuation. If the coating includes an electrically conductive layer such as Ag, TiN or ITO film the coating exhibits an electromagnetic shielding effect.

A heat insulating glass plate according to the invention transmits radio waves in the frequency range of from 100 to 1000 MHz with attenuation of only about 10-20 dB. In particular, in the frequency range of from 100 to 700 MHz the radio wave transmittance of the heat insulating glass plate is almost comparable to that of the uncoated glass plate: with respect to the degree of attenuation the difference between the heat insulating glass plate and the uncoated glass plate is only 1-3 dB.

In the Type I multilayer coating 20 or 20A each layer (21 to 23 or 25) has a thickness in the range from 100 to 2000 Å. If each layer is too thin the mechanical strength of each layer is insufficient, and the multilayer coating may become too high in reflectance for the visible light or transmittance for solar radiation. If each layer is too thick the optical characteristics of the multilayer coating may become worse, and the productivity of the coating lowers.

The Type I multilayer coating is constructed such that the transmittance of the coated glass plate for solar radiation is not higher than 65% and is lower than that of the uncoated glass plate (10) by at least 5%, and preferably by at least 10%. In this regard, the five-layer coating 20A is generally advantageous over the three-layer coating 20. Furthermore, the Type I multilayer coating is constructed such that the coated glass plate is not lower than 65% in transmittance for the visible light and not higher than 15% in reflectance for the visible light. Since the heat insulating glass plate is to be used as an automobile window glass a sufficiently high transmittance for the visible light is required for providing the driver or passengers with good visibility through the window glass. It is preferable that the transmittance for the visible light is not lower than 70%. If the reflectance for the visible light exceeds 15% the heat insulating glass plate is not very suitable for use as an automobile window glass because by a mirror effect images of inboard objects intrude into the driver's field of view and also because the window glass offers undesirable glare to the drivers of oncoming cars. It is desirable that the reflectance for the visible light is not higher than 13% and preferably not higher than 10%. With this multilayer coating the excitation purity of the reflected light is as low as about 10%, and accordingly the coated glass plate assumes a neutral color.

The Type I multilayer coating is fairly high in wear resistance. It is not difficult to make the multilayer coating such that by the Taber test using two abrading wheels of CS-10F type neither the amount of a change in the transmittance for the visible light nor the amount of a change in haze value exceeds 10% after 1000 turns of the abrading wheels under a load of 500 g. If the amount of the change in the transmittance or the amount of the change in haze value is larger than 10%, the multilayer coating may not be sufficient in durability as the coating on an automobile window glass and may become insufficient in transparency to the visible light.

In the case where the second layer 22 of the multilayer coating 20 is lower in refractivity than the first and third layers 21 and 23 (this case will be referred to as Type II multilayer coating), it is suitable to use $SnO_x$ ($0<x\leq2$), $TiO_x$ ($0<x\leq2$), $TaO_x$ ($0<x\leq2.5$), $ZrO_x$ ($0<x\leq2$), $AlN_x$ ($0<x\leq1$) or $SiN_x$ ($0<x\leq4/3$) as the material of the first and third layers 21 and 23, and also the fifth layer 25 of the five-layer coating 20A, and $SiO_x$ ($0<x\leq2$), $AlO_x$ ($0<x\leq1.5$) or $Si.AlO_x$ ($0<x\leq7/2$) as the material of the second layer 22 and also the fourth layer 24 of the five-layer coating 20A. It is preferred to employ a combination of $TiO_x$ and $SiO_x$. Using these dielectric materials the multilayer coating 20 or 20A is made so as to have a surface resistivity not lower than 10 k$\Omega$/□. Also in this case the heat insulating glass plate transmits radio waves in the frequency range of 100 to 1000 MHz with only a little attenuation. In particular, in the frequency range of from 100 to 700 MHz the radio wave transmittance of the heat insulating glass plate is almost comparable to the uncoated glass plate: with respect to the degree of attenuation the difference between the heat insulating glass plate and the uncoated glass plate is only 1-3 dB.

In the Type II multilayer coating 20 or 20A each layer (21 to 23 or 25) has a thickness in the range from 500 to 2000 Å. By so limiting the thickness of each layer it is easy to obtain a multilayer coating which is sufficiently low in the excitation purity of reflected light and accordingly assumes a neutral color. If each layer is thinner than 500 Å it is not easy to reduce the reflectance of the coating for solar radiation to 20% or below. If each layer is too thick the optical characteristics of the multilayer coating may become worse, and the productivity of the coating lowers.

The Type II multilayer coating is constructed such that the coated glass plate is not higher than 60% in transmittance for solar radiation and not lower than 20% in reflectance for solar radiation. Since these conditions are satisfied, when the coated glass plate is used in a laminated glass panel and as an automobile windshield or window glass the multilayer coating serve the purpose of enhancing the air conditioning effects and afford good habitability. Further, the Type II multilayer coating is constructed such that the coated glass plate is not lower than 70% in transmittance for the visible light and not higher than 15% in reflectance for the visible light. These conditions are imposed for the reasons explained hereinbefore with respect to the Type I multilayer coating. In the case of the Type II coating, use of the coated glass plate in laminated glass is also taken into consideration. Preferably the Type II coating is made such that the coated glass plate is not lower than 75% in transmittance for the visible light and not higher than 10% in reflectance for the visible light.

As an option common to the Type I and Type II multilayer coatings, the third layer 23 of the three-layer coating 20 or the fifth layer 25 of the five-layer coating 20A may be overlaid with a protective layer (not shown), which is formed of $SiO_x$, $AlO_x$ or $Si.AlO_x$ having a refractive index in the range from 1.4 to 1.7 and has a thickness in the range from 100 to 2000 Å.

The following nonlimitative examples are illustrative of the present invention.

EXAMPLE 1

A three-layer coating was formed on a 600 mm square and 5 mm thick plate of a transparent and gray glass (NGFL).

The glass plate was washed with a neutral detergent, rinsed with water and further with isopropyl alcohol and dried. Then the glass plate was set horizontally on a carrier which was horizontally movably installed in a vacuum chamber of a DC magnetron reactive sputtering apparatus. The carrier was reciprocatively movable so as to be positioned alternately above a Si target and a Ti target. Initially the chamver was depressurized to the extent of about $5\times10^{-6}$ Torr. Then a mixed gas of $O_2$ and Ar was introduced into the vacuum chamber to maintain the degree of vacuum at about $2\times10^{-3}$ Torr, and the Sn target was sputtered at a power of about 0.5 kW while the glass plate was horizontally moved in a region above the Sn target at a constant speed of about 50 mm/min. As the result a $SnO_2$ film having a thickness of about 600 Å deposited on the glass plate as the first layer 21 in FIG. 1.

Next, the glass plate was carried to the region above the Ti target, and the Ti target was sputtered at a power of about 2.5 kW while the glass plate was moved horizontally at a constant speed of about 20 mm/min. As the result a $TiO_2$ film having a thickness of about 50 Å deposited, as the second layer 22, on the $SnO_2$ film 21. Next, the glass plate was carried back to the region above the Sn target, and the Sn target was sputtered at a power of about 0.5 kW while the glass plate was horizontally moved at a constant speed of about 60 mm/min. As the result a $SnO_2$ having a thickness of about 500 Å deposited, as the third layer 23, on the $TiO_2$ film 22.

By the above process a three-layer coating (20) was formed on one side of the glass plate 10. Several samples were produced by the same process and under the same conditions.

On the samples of the coated glass plate the transmittance and reflectance for the visible light (380-780 nm) and transmittance of solar radiation (340-1800 nm) were measured with an automatic recording spectrophotometer (Type 340 of Hitachi Ltd.) by the methods according to JIS Z 8722 and JIS R 3106. The results are shown in Table 3. Without the coating (20), the 5 mm thick glass plate (NGFL) exhibited transmittance of 71.4% for solar radiation. In Table 3, $\Delta T_s$ is the difference of the solar radiation transmittance of the coated glass plate from that of the uncoated glass plate.

Besides, wear resistance of the multilayer coating was examined by the Taber test. The test was made on 10 cm square specimens of the coated glass plate with a Taber's abrasion tester (MODEL 503 of TYBER Co.) using two abrading wheels of CS-10F type. A load of 500 g was applied to each abrading wheel, and the test was continued until 1000 turns of the abrading wheels on the surface of the multilayer coating (20). Before and after testing the visible light transmittance of each specimen was measured to find the amount of a difference between the two measurements of the transmittance, $\Delta T$. Furthermore, before and after the Taber test the haze value of each specimen was measured with a haze meter (NDH-20D of Nippon Denshoku Kogyo Co.) to find a difference between the two measurements, $\Delta H$. The results are shown in Table 3.

Further, acid and alkali resistances of the three-layer coating were examined by immersing some specimens of the coated glass plate in 1N HCl solution at room temperature for about 6 hr and separate specimens in 1N NaOH solution at room temperature for about 6 hr. In both cases the degree of deterioration of the coating was examined by visual observation. On every specimen, deterioration of the coating was hardly perceptible.

Separate speciments of the coated glass plate were left standing in a chamber maintained at a temperature of about 50° C. and at a relative humidity of about 95% for 30 days to test the moisture resistance of the three-layer coating. By visual observation of the tested specimens, deterioration of the coating was hardly perceptible.

The surface resistivity of the coating was measured with a tester of the four-probe type (RT-8 of NAPSON Co.). The measurement was higher than 100 kΩ/□.

Figure 3:
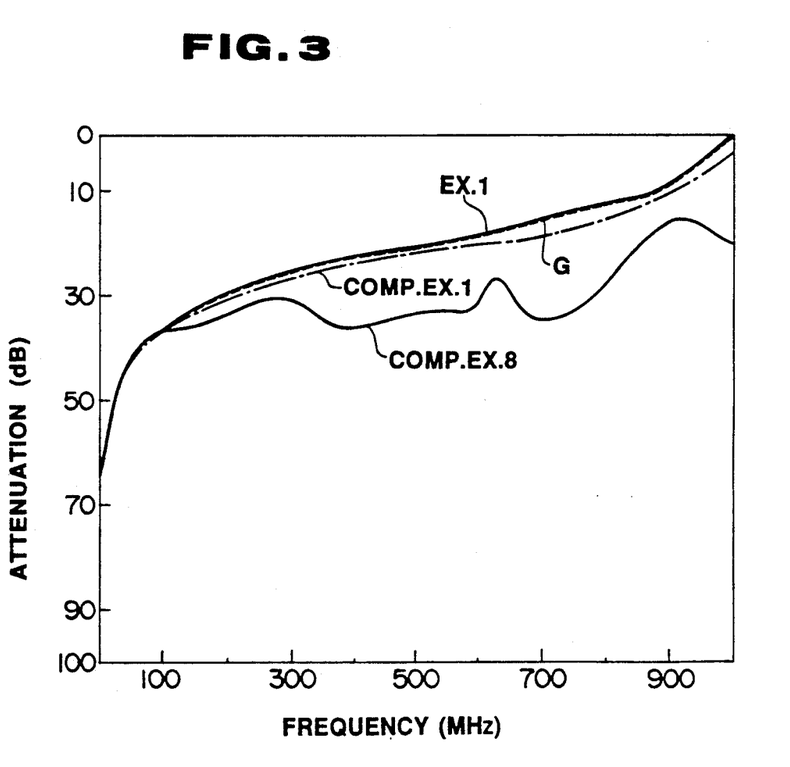
FIG. 3 is a graph showing the degree of a radio wave shielding effect of an example of dielectric multilayer coatings according to the invention in comparison with two examples of multilayer coatings having a conductive layer.

As to the radio wave transmittance of the heat insulating glass plate of Example 1, attenuations of radio waves through the heat insulating glass plate were measured at various frequencies ranging from 50 to 1000 MHz with testers TR17302 and TR4172 of ADVANTEST Co., Ltd. The results are shown in FIG. 3. For comparison, the glass plate (10) without the coating (20) was subjected to the same test. The results are shown in FIG. 3 by the curve G in broken line.

EXAMPLES 2-14

As shown in Table 1, in these examples the Type I multilayer coating of Example 1 was modified in respect of the thickness of each layer, the dielectric material relatively low in refractivity and/or the number of dielectric layers. The type and/or thickness of the transparent glass plate were also varied. As can be seen in Table 1, in Examples 7 and 8 the third layer 23 of the three-layer coating 20 was overlaid with a protective $SiO_2$ film. Examples 9–14 relate to the five-layer coating 20A, and in Example 14 the fifth layer 25 was overlaid with a protective $SiO_2$ film. As to the glass plates, NFL is a transparent, bronze color glass plate, and FL is a colorless transparent glass plate.

Table 3 shows the characteristics of the heat insulating glass plates of Examples 1–14 and the results of the Taber test on the multilayer coatings of these examples. The multilayer coatings of Examples 2–14 were also subjected to the acid and alkali resistance tests and the moisture resistance test described hereinbefore. In every example and by every test the coating exhibited little deterioration. In every example the coating had a surface resistivity higher than 100 kΩ/□.

COMPARATIVE EXAMPLES 1-10

As shown in Table 2, in each of Comparative Examples 1–10 a multilayer coating not in accordance with the invention was formed on a transparent glass plate. In Comparative Examples 1 and 4–10 the multilayer coatings were formed by fundamentally the same method as in Example 1.

In Comparative Examples 2 and 3 the multilayer coatings were formed by a sol-gel process. In Comparative Example 2, the glass plate (after washing, rinsing and drying) was first dipped in a solution of $Sn(O-n-C_4H_9)_3Cl$ and pulled up at a rate of about 1.2 mm/sec, then dried at 200° C. for 20 min, next dipped in a solution of $Ti(O-n-C_4H_7)_4$ and pulled up at a rate of about 1.0 mm/sec, then dried at 200° C. for 20 min, again dipped in the solution of $Sn(O-n-C_4H_9)_3Cl$ and pulled up at a rate of about 1.0 mm/sec, then dried at 200° C. for 20 min and finally baked at about 600° C. for 30 min. In Comparative Example 3, the process of Comparative Example 2 was repeated except that precedent to the final baking step the glass plate was dipped in a solution of $Si(O-C_2H_5)_4$ and pulled up at a rate of about 0.8 mm/sec.

Table 4 shows the characteristics of the coated glass plates of Comparative Examples 1–14 and the results of the Taber test on the multilayer coatings of these Comparative Examples. The coatings of Comparative Examples 2 and 3 (formed by the sol-gel process) and Comparative Example 8 (including Ag layers) were destructed by the Taber test.

The coatings of these comparative examples were subjected to the above described acid resistance test, alkali resistance test and moisture resistance test. The coating of Comparative Example 8 (including Ag layers) deteriorated significantly by any of these tests. The coatings of the other comparative examples were good in acid resistance, alkali resistance and moisture resistance.

The coatings of Comparative Examples 2-7, 9 and 10 were higher than 100 kΩ/□ in surface resistivity. However, the coating of Comparative Example 1 (including a TiN layer) and the coating of Comparative Example 8 (including Ag layers) were far lower than 10 kΩ/□. As shown in FIG. 3, the coating of Comparative Example 1 was apparently lower than the glass plate in transmittance for radio waves, and the coating of Comparative Example 8 was still and far lower.

TABLE 1

| | Glass Plate (thickness, mm) | Structure of Multilayer Coating (thickness, Å) | | | | | |
|---|---|---|---|---|---|---|---|
| | | 1st layer | 2nd layer | 3rd layer | 4th layer | 5th layer | 6th layer |
| Example 1 | NGFL (5) | $SnO_2$ (600) | $TiO_2$ (500) | $SnO_2$ (500) | | | |
| Example 2 | NGFL (3.5) | $SnO_2$ (1800) | $TiO_2$ (700) | $SnO_2$ (400) | | | |
| Example 3 | NFL (3.5) | $SnO_2$ (600) | $TiO_2$ (600) | $SnO_2$ (400) | | | |
| Example 4 | NFL (3.5) | $Ta_2O_5$ (1800) | $TiO_2$ (700) | $Ta_2O_5$ (400) | | | |
| Example 5 | NFL (3.5) | $ZrO_2$ (400) | $TiO_2$ (800) | $ZrO_2$ (1800) | | | |
| Example 6 | NFL (5) | $ZrO_2$ (600) | $TiO_2$ (500) | $ZrO_2$ (500) | | | |
| Example 7 | NGFL (5) | $Ta_2O_5$ (600) | $TiO_2$ (500) | $Ta_2O_5$ (1900) | $SiO_2$ (800) | | |
| Example 8 | NGFL (5) | $SnO_2$ (600) | $TiO_2$ (500) | $SnO_2$ (500) | $SiO_2$ (600) | | |
| Example 9 | NGFL (3.5) | $Ta_2O_5$ (200) | $TiO_2$ (800) | $Ta_2O_5$ (800) | $TiO_2$ (800) | $Ta_2O_5$ (200) | |
| Example 10 | NGFL (3.5) | $SnO_2$ (600) | $TiO_2$ (200) | $SnO_2$ (1200) | $TiO_2$ (600) | $SnO_2$ (400) | |
| Example 11 | NGFL (3.5) | $ZrO_2$ (200) | $TiO_2$ (1000) | $ZrO_2$ (400) | $TiO_2$ (800) | $ZrO_2$ (400) | |
| Example 12 | NFL (3.5) | $Ta_2O_5$ (200) | $TiO_2$ (800) | $Ta_2O_5$ (800) | $TiO_2$ (800) | $Ta_2O_5$ (200) | |
| Example 13 | NFL (3.5) | $SnO_2$ (1200) | $TiO_2$ (1000) | $SnO_2$ (1000) | $TiO_2$ (600) | $SnO_2$ (400) | |
| Example 14 | NGFL (5) | $SnO_2$ (200) | $TiO_2$ (800) | $SnO_2$ (800) | $TiO_2$ (800) | $SnO_2$ (200) | $SiO_2$ (400) |

TABLE 2

| | Glass Plate (thickness, mm) | Structure of Multilayer Coating (thickness, Å) | | | | | | |
|---|---|---|---|---|---|---|---|---|
| | | 1st layer | 2nd layer | 3rd layer | 4th layer | 5th layer | 6th layer | 7th layer |
| Comp. Ex. 1 | FL (3.5) | $SnO_2$ (600) | $TiN_2$ (220) | $SnO_2$ (600) | | | | |
| Comp. Ex. 2 | NGFL (5) | $SnO_2$ (600) | $TiO_2$ (500) | $SnO_2$ (500) | | | | |
| Comp. Ex. 3 | NGFL (5) | $SnO_2$ (600) | $TiO_2$ (500) | $SnO_2$ (500) | $SiO_2$ (600) | | | |
| Comp. Ex. 4 | FL (3.5) | $Ta_2O_5$ (200) | $TiO_2$ (400) | $Ta_2O_5$ (200) | | | | |
| Comp. Ex. 5 | NGFL (5) | $SnO_2$ (200) | $TiO_2$ (1800) | $SnO_2$ (1200) | | | | |
| Comp. Ex. 6 | FL (3.5) | AlN (200) | $TiO_2$ (1800) | AlN (1200) | | | | |
| Comp. Ex. 7 | NGFL (5) | $Ta_2O_5$ (600) | $TiO_2$ (500) | $Ta_2O_5$ (700) | $SiO_2$ (800) | | | |
| Comp. Ex. 8 | FL (3.5) | ZnO (400) | Ag (60) | Zn (20) | ZnO (800) | Ag (60) | Zn (20) | ZnO (400) |
| Comp. Ex. 9 | FL (3.5) | $SnO_2$ (200) | $SnO_2$ (800) | $SnO_2$ (1600) | $TiO_2$ (800) | $SnO_2$ (200) | | |
| Comp. Ex. 10 | NGFL (5) | $Ta_2O_5$ (600) | $TiO_2$ (500) | $Ta_2O_5$ (700) | $SiO_2$ (800) | | | |

TABLE 3

| | Visible Light Transmission | | | Visible Light Reflection | | | | Solar Radiation Transmission | | Taber Test | |
|---|---|---|---|---|---|---|---|---|---|---|---|
| | | | | uncoated side | | coated side | | | | | |
| | T (%) | $D_\lambda$ (nm) | $P_e$ (%) | $R_g$ (%) | $P_e$ (%) | $R_c$ (%) | $P_e$ (%) | $T_s$ (%) | $\Delta T_s$ (%) | $\Delta T$ (%) | $\Delta H$ (%) |
| Example 1 | 71.1 | 572 | 2.0 | 7.2 | 3.0 | 8.0 | 4.4 | 62.0 | 9.4 | −7.5 | 3.0 |
| Example 2 | 76.1 | 553 | 1.6 | 8.1 | 4.4 | 8.9 | 6.0 | 64.3 | 12.0 | −7.0 | 3.2 |
| Example 3 | 76.4 | 575 | 4.9 | 9.6 | 2.2 | 10.8 | 4.8 | 63.8 | 9.7 | −7.3 | 3.4 |
| Example 4 | 78.0 | 567 | 3.9 | 10.1 | 5.1 | 11.4 | 5.1 | 64.2 | 9.3 | −6.6 | 3.8 |
| Example 5 | 76.9 | 571 | 5.6 | 9.5 | 0.6 | 10.5 | 2.8 | 63.1 | 10.4 | −3.7 | 2.8 |
| Example 6 | 73.6 | 574 | 5.9 | 7.6 | 0.7 | 8.3 | 1.4 | 59.5 | 6.0 | −3.0 | 2.1 |
| Example 7 | 73.5 | 570 | 4.2 | 4.9 | 2.3 | 4.0 | 6.9 | 63.0 | 8.4 | −3.9 | 2.7 |
| Example 8 | 73.7 | 574 | 3.1 | 4.8 | 3.8 | 3.9 | 7.7 | 64.9 | 6.5 | −4.2 | 2.8 |
| Example 9 | 74.5 | 538 | 1.5 | 10.2 | 7.5 | 11.9 | 9.7 | 59.8 | 16.5 | −4.8 | 3.5 |
| Example 10 | 75.6 | 538 | 1.3 | 8.5 | 6.6 | 9.5 | 8.7 | 63.4 | 12.9 | −8.0 | 2.7 |
| Example 11 | 77.1 | 553 | 1.1 | 8.3 | 2.5 | 9.1 | 2.3 | 63.4 | 12.9 | −3.9 | 2.5 |
| Example 12 | 76.3 | 562 | 4.4 | 10.6 | 7.3 | 12.1 | 9.6 | 58.0 | 15.5 | −5.0 | 3.2 |
| Example 13 | 76.3 | 572 | 5.8 | 10.6 | 2.2 | 12.2 | 3.6 | 59.9 | 13.6 | −6.0 | 2.7 |
| Example 14 | 72.5 | 570 | 2.5 | 6.6 | 1.1 | 7.2 | 3.3 | 58.5 | 12.9 | −4.5 | 3.0 |

T: transmittance
$D_\lambda$: dominant wavelength
$R_g$: reflectance
$R_c$: reflectance
$T_s$: transmittance

TABLE 4

| | Visible Light Transmission | | | Visible Light Reflection | | | | Solar Radiation Transmission | | Taber Test | |
|---|---|---|---|---|---|---|---|---|---|---|---|
| | | | | uncoated side | | coated side | | | | | |
| | T (%) | $D_\lambda$ (nm) | $P_e$ (%) | $R_g$ (%) | $P_e$ (%) | $R_c$ (%) | $P_e$ (%) | $T_s$ (%) | $\Delta T_s$ (%) | $\Delta T$ (%) | $\Delta H$ (%) |
| Comp. Ex. 1 | 72.3 | 512 | 1.4 | 14.5 | 22.2 | 9.5 | 53.0 | 60.7 | 25.5 | −5.2 | 3.5 |
| Comp. Ex. 2 | 71.0 | 573 | 3.0 | 7.8 | 3.5 | 8.5 | 4.6 | 63.0 | 8.4 | * | * |
| Comp. Ex. 3 | 74.0 | 580 | 3.5 | 5.0 | 4.0 | 4.3 | 8.0 | 65.0 | 6.4 | * | * |
| Comp. Ex. 4 | 66.2 | 474 | 3.1 | 32.0 | 9.6 | 32.9 | 9.5 | 66.6 | 18.6 | −7.0 | 3.9 |
| Comp. Ex. 5 | 57.5 | 560 | 8.6 | 23.5 | 29.2 | 30.9 | 30.5 | 65.1 | 6.3 | −8.0 | 5.0 |
| Comp. Ex. 6 | 73.7 | 489 | 1.5 | 26.9 | 7.5 | 27.2 | 6.8 | 73.7 | 11.5 | −4.0 | 3.8 |
| Comp. Ex. 7 | 72.2 | 568 | 2.5 | 6.0 | 10.6 | 6.0 | 15.0 | 69.0 | 2.4 | −3.6 | 2.7 |
| Comp. Ex. 8 | 83.0 | 496 | 0.8 | 7.7 | 2.5 | 7.8 | 3.5 | 59.9 | 25.3 | * | * |
| Comp. Ex. 9 | 74.6 | 489 | 9.7 | 25.2 | 35.8 | 25.7 | 36.1 | 67.2 | 18.0 | −7.5 | 4.5 |
| Comp. Ex. 10 | 72.2 | 568 | 2.5 | 6.0 | 10.6 | 6.0 | 15.0 | 69.0 | 2.4 | −3.6 | 2.7 |

T: transmittance
$D_\lambda$: dominant wavelength
$R_g$: reflectance
$R_c$: reflectance
$T_s$: transmittance
*multilayer coating vanished The following examples relate to the Type II multilayer coating.

EXAMPLE 15

A three-layer coating was formed on a 600 mm square and 2.3 mm thick plate of a transparent, bronze color glass (NFL).

The glass plate was washed with a neutral detergent, rinsed with water and further with isopropyl alcohol and dried. Then the glass plate was set horizontally on a carrier which was horizontally movably installed in a vacuum chamber of a DC magnetron reactive sputtering apparatus. The carrier was reciprocatively movable so as to be positioned alternately above a Ti target and a $SiO_2$ target. Initially the chamber was depressurized to the extent of about $5\times10^{-6}$ Torr. Then a mixed gas of $O_2$ and Ar was introduced into the vacuum chamber to maintain the degree of vacuum at about $2\times10^{-3}$ Torr, and the Ti target was sputtered at a power of about 2.5 kW while the glass plate was horizontally and reciprocatively moved in a region above the Ti target at a constant speed of about 10 mm/min. The sputtering operation was continued until the glass plate made nine shuttling travels above the Ti target. As the result a $TiO_x$ film having a thickness of about 900 Å deposited on the glass plate as the first layer 21 in FIG. 1. Next, the glass plate was carried to the region above the $SiO_2$ target, and the $SiO_2$ target was sputtered at a power of about 2.5 kW while the glass plate was moved horizontally at a constant rate of about 11 mm/min. As the result a $SiO_x$ film having a thickness of about 1400 Å deposited, as the second layer 22, on the $TiO_x$ film 21. Next, the glass plate was carried back to the region above the Ti target, and the initial sputtering operation was repeated to thereby deposit a $TiO_x$ film having a thickness of about 900 Å, as the third layer 23, on the $SiO_x$ film 22.

Figure 4:
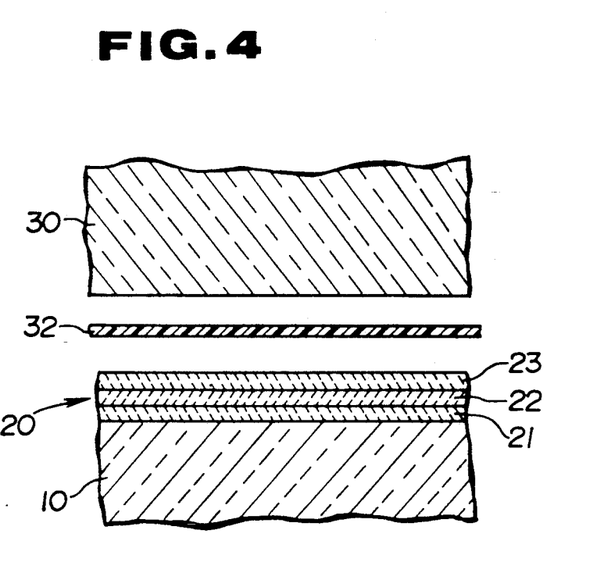
FIG. 4 shows, in a fragmentary and explanatorily enlarged sectional view, the manner of laminating the heat insulating glass plate of FIG. 1 with an uncoated glass plate.

The heat insulating glass plate obtained by the above process was used as a component of a laminated glass panel for use as a vehicle window glass. Referring to FIG. 4, the glass plate 10 with the three layer coating 20 thereon was laminated with a transparent and colorless glass plate (FL) 30 having a thickness of 2 mm such that the coating 20 faced the glass plate 30. In the usual manner a polyvinyl butyral film 32 was interposed between the two glass plates, and the lamination was completed by application of heat and pressure in an autoclave.

On specimens of the laminated glass panel, the transmittance and reflectance for the visible light (380-780 nm), and transmittance and reflectance for solar radiation (340-1800 nm) were measured with the instruments mentioned in Example 1. The results are shown in Table 6.

Prior to the lamination, the surface resistivity of the coating 20 was measured with a tester of the four-probe type (RT-8 of NAPSON Co.). The measurement was higher than $1M\Omega/\square$. To evaluate the laminated glass panel with respect to transmittance of radio waves, a glass antenna (constructed of conductive strips printed on glass surface) was provided on the inboard surface (the uncoated glass plate 30) of the laminated glass, and reception gains of the glass antenna for television broadcast waves were measured and compared with the reception gains of an identical glass antenna on a laminated glass panel having no coating. Compared with the antenna on the laminated glass panel without coating, an average decrease in the reception gains of the antenna on the laminated glass having the heat insulating coating 20 was about −0.5 dB. Insofar as the amount of decrease in the reception gains attributed to the esistence of the coating is not more than about −2 dB, the coating can be judged to be sufficient in transmittance for radio waves. In advance, experiments were conducted on the relationship between the surface resistivity of the coating 20 and the amount of decrease in the reception gains of the glass antenna. The experimental results show that when the surface resistivity is not more than $10 k\Omega/\square$ the amount of decrease in the reception gains is not more than about −2 dB.

EXAMPLES 16-21

As shown in Table 5, in these examples the Type II multilayer coating of Example 15 was modified in respect of the thickness of each layer and/or the number of dielectric layers. As can been seen in Table 5, Examples 18-21 relate to the five-layer coating 20A.

The heat insulating glass plate of every example was laminated with the transparent and colorless glass plate (FL, 2 mm) in the same manner as in Example 15. Table 6 shows the characteristics of the laminated glass panels of Examples 15-21. As to the radio wave transmittance, in Table 6 "OK" means that the surface resistivity of the coating 20 or 20A was not higher than $10 k\Omega/\square$, and "NG" means that the resistivity was higher than $10 k\Omega/\square$.

COMPARATIVE EXAMPLES 11-16

As shown in Table 5, in each of Comparative Examples 11-14 a multilayer coating not in accordance with the invention or a single-layer coating was formed on a transparent glass plate, and the coated glass plate was laminated with the transparent and colorless glass plate (FL, 2 mm). The glass plate GFL used in Comparative Example 11 is a transparent, grayish color glass plate. In every case the three-layer or single-layer coating was formed by a sputtering process analogous to the process employed in Example 15.

As Comparative Example 15, the transparent, bronze color glass plate (NFL) was laminated with the transparent and colorless glass plate (FL, 2 mm) without forming any coating on the former glass plate. As Comparative Example 16, a transparent, greenish color glass plate (GREEN) was tested without coating and without laminating.

Table 6 shows the characteristics of the laminated glass panels of Comparative Examples 11-15 and the glass plate of Comparative Example 16.

In Comparative Example 15, the surface resistivity of the coating was so low that the amount of decrease in the reception gains of the glass antenna on the laminated glass panel reached about −25 dB. In Comparative Examples 13 and 14 the amounts of decrease in the reception gains of the glass antenna were about −6 dB and about −10 dB, respectively.

As to the glass plates used in Examples 1-21 and Comparative Examples 1-15, the measurements of transmittance and reflectance for visible light, and transmittance and reflectance for solar radiation were as shown in Table 7.

TABLE 5

| | Glass Plate (thickness, mm) | Structure of Multilayer Coating (thickness, Å) | | | | |
| --- | --- | --- | --- | --- | --- | --- |
| | | 1st layer | 2nd layer | 3rd layer | 4th layer | 5th layer |
| Example 15 | NFL (2.3) | $TiO_x$ (900) | $SiO_x$ (1400) | $TiO_x$ (900) | | |
| Example 16 | NFL (2.3) | $TiO_x$ (1000) | $SiO_x$ (1800) | $TiO_x$ (1000) | | |
| Example 17 | NFL (2.3) | $TiO_x$ (1100) | $SiO_x$ (600) | $TiO_x$ (1100) | | |
| Example 18 | NFL (2.3) | $TiO_x$ (1100) | $SiO_x$ (800) | $TiO_x$ (1200) | $SiO_x$ (800) | $TiO_x$ (1100) |
| Example 19 | NFL (2.3) | $TiO_x$ (900) | $SiO_x$ (1400) | $TiO_x$ (800) | $SiO_x$ (1400) | $TiO_x$ (900) |
| Example 20 | NFL (2.3) | $TiO_x$ (1100) | $SiO_x$ (800) | $TiO_x$ (1100) | $SiO_x$ (800) | $TiO_x$ (1100) |
| Example 21 | NFL (2.3) | $TiO_x$ (1100) | $SiO_x$ (1400) | $TiO_x$ (1000) | $SiO_x$ (1400) | $TiO_x$ (1100) |
| Comp. Ex. 11 | GFL (2.3) | $ZnO_x$ (400) | Ag (150) | $ZnO_x$ (400) | | |
| Comp. Ex. 12 | NFL (2.3) | $SnO_x$ (600) | $TiO_x$ (500) | $SnO_x$ (500) | | |
| Comp. Ex. 13 | FL (2.3) | $TiN_x$ (50) | | | | |
| Comp. Ex. 14 | FL (2.3) | $TiN_x$ (100) | | | | |
| Comp. Ex. 15 | NFL (2.3) | | | | | |

TABLE 5-continued

| Glass Plate (thickness, mm) | Structure of Multilayer Coating (thickness, Å) | | | | |
|---|---|---|---|---|---|
| | 1st layer | 2nd layer | 3rd layer | 4th layer | 5th layer |
| Comp. Ex. 16 GREEN (5) | | | | | |

TABLE 6

| | Laminated Glass | | | | | | Radio Wave Transmittance (Surface Resistance) |
|---|---|---|---|---|---|---|---|
| | Visible Light | | | Solar Radiation | | | |
| | | Reflectance | | | Reflectance | | |
| | Transmittance (%) | inboard side (%) | outboard side (%) | Transmittance (%) | inboard side (%) | outboard side (%) | |
| Example 15 | 78.0 | 10.8 | 11.4 | 52.0 | 23.0 | 25.7 | OK |
| Example 16 | 77.8 | 11.1 | 11.8 | 54.7 | 21.7 | 23.3 | OK |
| Example 17 | 80.1 | 10.8 | 11.3 | 56.4 | 20.6 | 21.6 | OK |
| Example 18 | 80.9 | 10.6 | 11.3 | 47.2 | 27.7 | 30.7 | OK |
| Example 19 | 77.6 | 10.4 | 10.9 | 45.5 | 28.2 | 31.6 | OK |
| Example 20 | 80.8 | 10.4 | 11.0 | 47.3 | 28.0 | 30.3 | OK |
| Example 21 | 80.1 | 9.4 | 10.0 | 56.6 | 27.3 | 30.9 | OK |
| Comp. Ex. 11 | 72.5 | 9.0 | 9.0 | 53.5 | 20.5 | 20.3 | NG |
| Comp. Ex. 12 | 80.3 | 7.6 | 7.5 | 67.5 | 10.6 | 10.6 | OK |
| Comp. Ex. 13 | 73.6 | 7.7 | 7.8 | 62.5 | 7.0 | 7.0 | NG |
| Comp. Ex. 14 | 62.5 | 8.9 | 8.9 | 51.5 | 9.0 | 8.6 | NG |
| Comp. Ex. 15 | 81.6 | 7.3 | 7.3 | 71.5 | 6.6 | 6.6 | OK |
| Comp. Ex. 16 | 76.2 | 7.1 | 7.1 | 48.5 | 5.5 | 5.5 | OK |

TABLE 7

| Glass Plate (thickness, mm) | Visible Light | | Solar Radiation | |
|---|---|---|---|---|
| | Transmittance (%) | Reflectance (%) | Transmittance (%) | Reflectance (%) |
| NGFL (3.5) | 77.4 | 6.2 | 76.3 | 5.6 |
| NGFL (5) | 71.7 | 6.9 | 71.4 | 6.9 |
| NFL (2.3) | 83.2 | 6.8 | 79.7 | 6.0 |
| NFL (3.5) | 79.1 | 6.5 | 73.5 | 5.6 |
| NFL (5) | 74.1 | 7.0 | 65.5 | 6.1 |
| FL (2) | 90.8 | 8.3 | 88.0 | 7.8 |
| FL (3.5) | 90.0 | 8.1 | 85.2 | 7.5 |
| GFL (2.3) | 82.6 | 7.5 | 82.0 | 7.3 |

What is claimed is:

1. A heat insulating glass plate particularly suitable as a vehicle window glass, having a transparent glass plate and a multilayer coating formed on one side of the glass plate, the multilayer coating comprising:
   a first layer which is a transparent and dielectric film of a aluminum nitride having a refractive index in the range from 1.8 to 2.1 deposited on a surface of the glass plate;
   a second layer which is a transparent and dielectric film of a titanium oxide having a refractive index in the range from 2.2 to 2.5 deposited on said first layer; and
   a third layer which is a transparent and dielectric film of a aluminum nitride having a refractive index in the range from 1.8 to 2.1 deposited on said second layer;
   each of said first, second and third layers being formed by a sputtering process or a chemical vapor deposition process and having a thickness in the range from 100 to 2000 Å and a surface resistivity not lower than 10 kΩ/□, the multilayer coating being formed such that the heat insulating glass plate is not lower than 65% in transmittance for the visible light, not higher than 15% in reflectance for the visible light and not higher than 65% in transmittance for solar radiation and such that the heat insulating glass plate is lower than the glass plate itself in transmittance for solar radiation by at least 5%.

2. A heat insulating glass plate according to claim 1, further comprising a protective coating layer which is a film of an oxide of at least one metal selected from the group consisting of Si and Al deposited on said third layer and has a thickness in the range from 100 to 2000 Å.

3. A heat insulating glass plate according to claim 2, wherein said protective coating layer has a refractive index in the range from 1.4 to 1.7.

4. A heat insulating glass plate according to claim 1, further comprising a fourth layer which is a transparent and dielectric film of a metal compound having a refractive index in the range from 2.2 to 2.5 deposited on said third layer, and a fifth layer which is a transparent and dielectric film of a metal compound having a refractive index in the range from 1.8 to 2.1 deposited on said fourth layer, each of said fourth and fifth layers being formed by a sputtering process or a chemical vapor deposition process and having a thickness in the range from 100 to 2000 Å.

5. A heat insulating glass plate according to claim 4, wherein said metal compound of said fifth layer is aluminum nitride, and said metal compound of fourth layer is an oxide of Ti.

6. A heat insulating glass plate according to claim 4, further comprising a protective coating layer which is a film of an oxide of at least one metal selected from the group consisting of Si and Al deposited on said fifth layer and has a thickness in the range from 100 to 2000 Å.

7. A heat insulating glass plate according to claim 6, wherein said protective coating layer has a refractive index in the range from 1.4 to 1.7.

8. A heat insulating glass plate according to claim 1, wherein the glass plate is a color glass plate.

9. A heat insulating glass plate particularly suitable as a vehicle window glass, having a transparent glass plate and a multilayer coating formed on one side of the glass plate, the multilayer coating consisting essentially of:

a first layer which is a transparent and dielectric film of a tin oxide having a refractive index in the range from 1.8 to 2.1 deposited on a surface of the glass plate;

a second layer which is a transparent and dielectric film of a titanium oxide having a refractive index in the range from 2.2 to 2.5 deposited on said first layer; and a third layer which is a transparent and dielectric film of a tin oxide having a refractive index in the range from 1.8 to 2.1 deposited on said second layer;

each of said first, second and third layers being formed by a sputtering process or a chemical vapor deposition process and having a thickness in the range from about 400 to about 600 Å and a surface resistivity not lower than 10 k$\Omega$/□, the multilayer coating being formed such that the heat insulating glass plate is not lower than 65% in transmittance for the visible light, not higher than 15% in reflectance for the visible light and not higher than 65% in transmittance for solar radiation and such that the heat insulating glass plate is lower than the glass plate itself in transmittance for solar radiation by at least 5%.

10. The heat insulating glass plate of claim 9, further consisting essentially of a protective coating layer which is a film of an oxide of at least one metal selected from the group consisting of Si and Al deposited on said third layer and has a thickness in the range from 100 to 2000 Å.

11. The heat insulating glass plate of claim 10, wherein said protective coating has a refractive index in the range from 1.4 to 1.7.

12. The heat insulating glass plate of claim 9, wherein the glass plate is a color glass plate.

* * * * *